United States Patent [19]

Tremblay

[11] Patent Number: 5,345,734
[45] Date of Patent: Sep. 13, 1994

[54] SEALING DEVICE FOR DOUBLE GLAZED WINDOW ASSEMBLY

[75] Inventor: Luc Tremblay, Boucherville, Canada

[73] Assignee: Rivetec Inc., Montreal, Canada

[21] Appl. No.: 97,208

[22] Filed: Jul. 27, 1993

[30] Foreign Application Priority Data

Jan. 25, 1993 [CA] Canada ............................. 2088027-9

[51] Int. Cl.⁵ .......................... F06B 1/04; F16B 13/04
[52] U.S. Cl. ................... 52/204.52; 52/302.7; 411/43; 411/903
[58] Field of Search ................ 411/43, 55, 57, 903; 52/204.52, 302.7

[56] References Cited

U.S. PATENT DOCUMENTS

| 2,289,558 | 7/1942 | Thompson | 52/204.52 |
| 2,880,475 | 4/1959 | Mills | 52/204.52 |
| 4,521,147 | 6/1985 | King, Jr. et al. | 411/43 |
| 4,949,450 | 8/1990 | Scharres | 411/43 X |

FOREIGN PATENT DOCUMENTS

| 2519393 | 7/1983 | France | 411/43 |
| 594859 | 11/1947 | United Kingdom | 411/43 |

Primary Examiner—Neill R. Wilson
Attorney, Agent, or Firm—Cushman, Darby & Cushman

[57] ABSTRACT

The disclosure herein describes a sealing device for a use in a sealed double glazed window assembly consisting of a pair of glass sheets arranged in spaced parallel relationship to form an air space therebetween and of a spacing unit disposed between the inner marginal edges of the glass sheets. The device comprises a flexible plug that fits into holes made in the spacing unit to allow a gas to be injected into the space between the sheets. A blind rivet is provided within the plug and when an outward pull is exerted on the rivet, an expansion of the plug results to thereby sealingly contain the gas injected between the glass sheets.

6 Claims, 1 Drawing Sheet

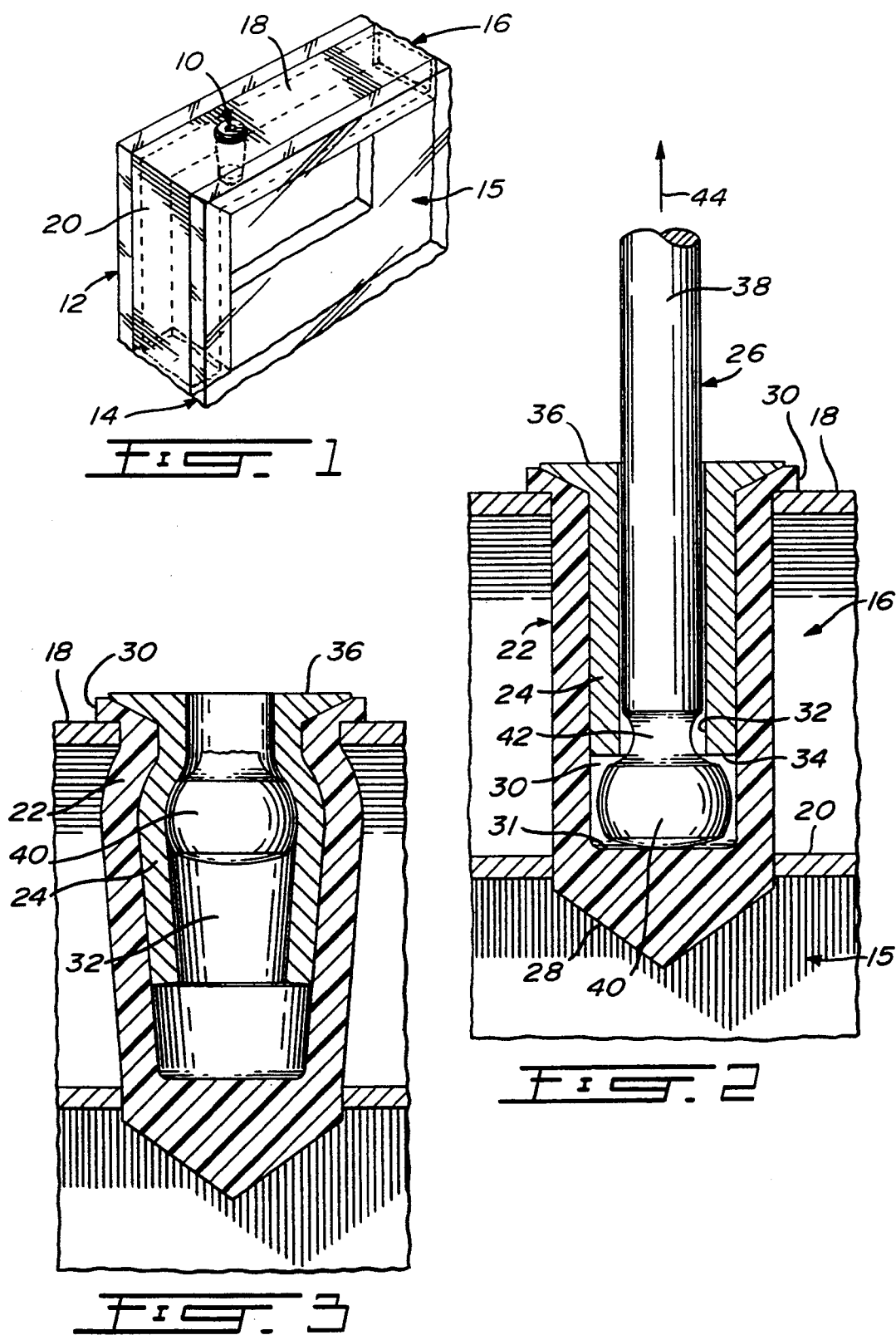

SEALING DEVICE FOR DOUBLE GLAZED WINDOW ASSEMBLY

FIELD OF THE INVENTION

The present invention relates to a sealing device for use with a sealed double glazed window assembly which is formed of a pair of glass sheets arranged in spaced parallel relationship to one another and of a spacing unit disposed between the inner marginal edges of the glass sheets.

BACKGROUND OF THE INVENTION

In this type of window assembly, it is now usual to replace the air in the space between the glass sheets with a gas to improve the insulation of the double glazed window. To achieve this, at least two holes are made in the spacing unit one for the injection of the gas, the outer for the exit of air being replaced with gas.

OBJECTS OF THE PRESENT INVENTION

It is an object of the present invention to provide a sealing device which will be inserted into these two holes immediately after the gas injection operation.

The present invention therefore relates to a sealing device for such sealed double glazed window assembly which comprises:
a flexible plug adapted to fit into a hole made in the spacing unit of the assembly to allow a gas to be injected into the space between the glass sheets; the plug has; a hollow cavity with an open end terminating at the outer face of the spacing unit; and
a blind rivet having a portion extending within the cavity of the plug, the rivet consisting of
 a) a deformable sleeve member received in the cavity;
 b) a stem coaxially positioned within the sleeve member and having, at one end thereof, an enlarged head portion positioned inside the cavity below the sleeve member and having an outer diameter greater than that of the sleeve member; the stem has a frangible neck of reduced size inside the cavity; the sleeve member is deformed by an outward pulling action on the stem whereby the enlarged head portion is forcingly engaged in the sleeve member and deforms the sleeve member to expand the plug in the hole of the spacing unit to thereby sealingly contain the gas injected between the glass sheets.

In one preferred form of the invention, the plug is made of a plastic material, such as nylon, which is resistant to ultra-violet radiation.

Other objects and further scope of applicability of the present invention will become apparent from the detailed description given hereinafter.

It should be understood, however, that this detailed description, while indicating preferred embodiments of the invention, is given by way of illustration only, since various changes and modifications within the spirit and scope of the invention will become apparent to those skilled in the art.

BRIEF DESCRIPTION OF THE DRAWINGS

FIG. 1 is a perspective view showing on corner of a window assembly with which the sealing device of the present invention is used;

FIG. 2 is a cross-sectional view showing the sealing device inserted into the spacing unit prior to the outward pull; and FIG. 3 is a cross-sectional view showing the sealing device in sealing engagement with the spacing unit of the window assembly.

DESCRIPTION OF PREFERRED EMBODIMENTS

Referring to FIG. 1, there is shown a sealing device, generally denoted 10, being fitted in a window assembly that consists of a pair of glass sheets 12 and 14 arranged in spaced parallel relationship to one another and forming an air space 15 therebetween. The window assembly also includes a rectangular spacing unit 16 having inner and outer faces 18 and 20 and opposite side faces in sealed contact with the marginal edges of the glass sheets. There is a great variety of window assemblies and their construction is well known in the art; therefore, further detailed description of the window construction illustrated is not deemed necessary. However, it is now more and more requested to replace the air between the glass sheets with a gas, such as argon, to improve the thermal barrier between both sides of window assemblies. To achieve this, it is necessary to drill holes in the spacing unit of the window assembly so that gas may be injected from one hole between the glass sheets and air may exit from a second hole, preferably on an opposite spacing unit of the window assembly.

The present invention is therefore concerned with providing a sealing plug to be inserted into these holes after the gas has been injected.

Referring to FIG. 2, the sealing device comprises a flexible cylindrically shaped plug 22 and a blind rivet consisting of sleeve member 24 and of stem 26.

The plug 22 is closed at one end 28 to define a hollow cavity 30 with a bottom wall 31 on which sits the blind rivet. In the embodiment illustrated, plug 22 traverses outer face 18 and inner face 20 of the spacing unit 16. The open end of the plug has peripheral flange 30 that rests on the outer face 18 of the spacing unit adjacent the hole. One preferred material for the plug is a plastic, such as nylon, which is resistant to ultraviolet radiation.

The sleeve member 24 is made of a deformable or expandable material; it has a cylindrical bore 32 and its lower extremity 34 terminates short of the bottom 31 of the plug. The sleeve member has, at its upper end, a tapered flange 36 which has an inclined under face which is adapted to rest against the correspondingly shaped upper face of the peripheral flange 30 of the plug.

The stem 26 has an elongated portion 38 extending outside the plug and an enlarged head portion 40 resting inside plug on the bottom wall 31. A neck 42 of reduced cross-section is provided adjacent the head portion 40. As can be seen, the outer diameter of the enlarged head portion 40 is greater than the inner diameter 32 of the sleeve member 24. Also, the latter's lower end terminates slightly above the enlarged head portion 40.

Referring to FIG. 3, to deform the device to give it a sealing function, an outward pull, in the direction of arrow 44, is exerted on portion 38 forcing upwardly the enlarged head portion 40 into the bore wall 32 of the sleeve member 24. This pulling action causes the sleeve member to expand radially outwardly causing the plug 22 to expand also and form a tight sealing engagement in the hole of wall 18 of the spacing unit, sealing being further secured by a squeezing engagement in the area of the peripheral flange 30 of the plug. Thereafter, the stem portion 38 is broken off at the neck 42 so that only the head portion 40 of the stem will remain inside the plug, thus leaving only face 36 of the sleeve close to the plane of outer face 18. Although not shown, the plane of face 36 of the sleeve member could be further moved into the plane of face 18 if, at the time of drilling the holes, that area of the spacing unit is slightly deformed inwardly.

Although the invention has been described above with respect with one specific form, it will be evident to a person skilled in the art that it may be modified and refined in various ways. It is therefore wished to have it understood that the present invention should not be limited in scope, except by the terms of the following claims.

The embodiments of the invention in which an exclusive property or privilege is claimed are defined as follows:

1. In combination, a sealed double glazed window assembly comprising a pair of glass sheets arranged in spaced parallel relationship to form an air space therebetween and a spacing unit disposed between the inner marginal edges of the glass sheets, said spacing unit having an inner face and outer face, each said face having a hole registry with one another, said holes being providing the injection of a as into said space; and a sealing device comprising:

a flexible plug adapted to fit into said holes; said plug defining a hollow cavity having an open end terminating at said outer face of said unit; and a blind rivet having a portion extending within said cavity of said plug, said rivet comprising a) a deformable sleeve member received in said cavity;

b) a stem coaxially positioned within said sleeve member, said stem having, at one end thereof, an enlarged head portion positioned inside said cavity below said sleeve member and having an outer diameter greater than that of said sleeve member; said stem having a frangible neck of reduced size inside said cavity; said stem having a portion extending outside said plug; said sleeve member being deformed by an outward pulling action, exerted on said outside portion of said stem whereby said enlarged head portion is forcibly engaged in said sleeve member and deforms said sleeve member to expand said plug in said hole of said spacing unit to thereby sealingly contain the gas injected between the glass sheets.

2. A sealing device as defined in claim 1, wherein said plug is formed of a plastic material resistant to ultra-violet radiation.

3. A sealing device as defined in claim 1, wherein said plug has an upper peripheral flange resting on the outer face of said spacing unit about said hole.

4. A sealing device as defined in claim 3, wherein said plug has an outer cylindrical wall with an outer diameter corresponding substantially to the diameter of the hole made in the spacing unit.

5. A sealing device as defined in claim 4, wherein said sleeve member is tubular in shape with one end thereof having a peripheral flange resting on the upper peripheral flange of said plug.

6. A sealing device as defined in claim 1, wherein said spacing unit has a rectangular shape and wherein said plug extends through holes coaxially provided in said inner and outer faces of said spacing unit.

* * * * *